United States Patent
Strapp et al.

[15] 3,706,962
[45] Dec. 19, 1972

[54] APPARATUS FOR DETERMINING THE PRESENCE OF A VESSEL BY DETECTING ITS WAKE

[72] Inventors: Joseph P. Strapp, Glendora; Neri E. Cornford, Pasadena, both of Calif.

[73] Assignee: The United States of America as represented by the Secretary of the Navy

[22] Filed: March 5, 1971

[21] Appl. No.: 121,421

[52] U.S. Cl. .................... 340/4 R, 73/170 A, 73/361
[51] Int. Cl. ................................................. G01k 7/12
[58] Field of Search ..... 340/4 R; 73/170 A, 341, 359, 73/361

[56] References Cited

UNITED STATES PATENTS 3,267,418   8/1966   Wolfe ................................. 340/4 R Primary Examiner—Richard A. Farley
Attorney—R. S. Sciascia, Ervin F. Johnston and John Stan

[57] ABSTRACT

Apparatus for determining the presence of a vessel, such as a submarine in the ocean, by detecting its wake, comprising a test thermocouple (TC) junction connected to a length of two thermocouple conductors, and a heat sink, into which the free ends of the conductors are immersed, to form a reference thermocouple junction. An electrical instrument, such as a pen chart recorder, is connected to the free ends of the two conductors, the pen of the instrument being adapted for setting to a reference level, generally zero, when the voltage across the two conductors is constant, indicating that the test TC junction is in an environment where the temperature of the water is static. A submersible tow is used capable of being towed by a vehicle, generally a surface vessel. The test TC junction is mounted on the submersible tow, and thus monitors the temperature of the water, whereby a marked deviation in the temperature of the water from its static value, which indicates the presence of the wake of the vessel, is detectable on the scale of the electrical instrument by a corresponding deviation in the reading of the instrument from the reference level reading.

10 Claims, 4 Drawing Figures

Basic Apparatus for Determining the Presence of a Wake.

(PRIOR ART) THERMOCOUPLE, SHOWING THE TEST AND REFERENCE JUNCTIONS AND ASSOCIATED CIRCUITRY.

BASIC APPARATUS FOR DETERMINING THE PRESENCE OF A WAKE.

JOSEPH P. STRAPP,
NERI E. CORNFORD
INVENTORS
By ERVIN F. JOHNSTON,
ATTORNEY.
JOHN STAN,
AGENT.

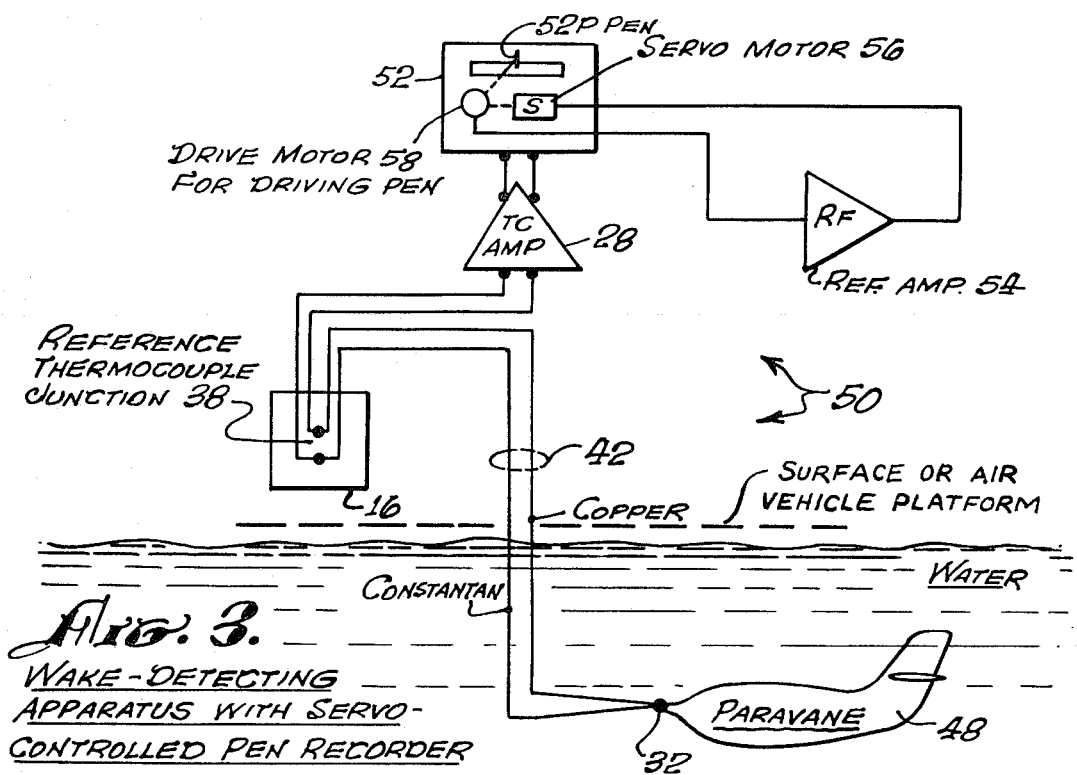
Fig. 3. Wake-Detecting Apparatus with Servo-Controlled Pen Recorder
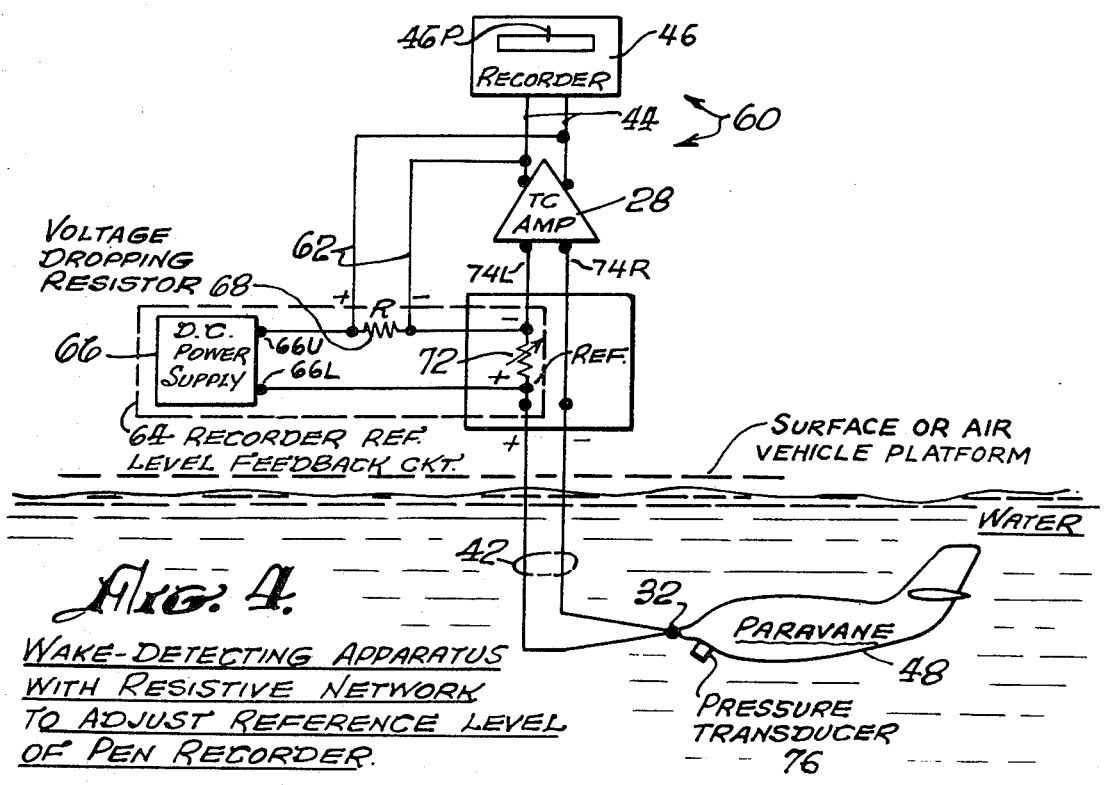
Fig. 4. Wake-Detecting Apparatus with Resistive Network to Adjust Reference Level of Pen Recorder.

APPARATUS FOR DETERMINING THE PRESENCE OF A VESSEL BY DETECTING ITS WAKE

STATEMENT OF GOVERNMENT INTEREST

The invention described herein may be manjufactured and used by or for the Government of the United States of America for governmental purposes without the payment of any royalties thereon or therefor.

BACKGROUND OF THE INVENTION

This invention relates to an apparatus and method for determining the presence of an ocean-going vessel by detection of its wake. The detected vessel may be either a surface vessel or an underwater vessel, such as a submarine.

A test thermocouple (TC) junction, mounted on a towed vehicle and connected to two conductors of suitable length, is towed beneath the surface of the water by a surface vessel. The TC junction, in effect, monitors the temperature of the water through which it is trolled. The voltage generated by the test thermocouple junction is amplified and may be used to drive the pen of a chart recorder. Significant deviations of the pen from a static reference level may indicate the detection of the wake of a vessel.

In the prior art, pressure transducers, for example of the piezoelectric type, have been used, with amplifiers, to detect the presence of a wake.

Pinging methods used in the prior art to detect a wake involve cumbersome and complicated electronic equipment.

Detection of a wake by an infrared detection scheme has similar disadvantages.

The detection method using a test thermocouple junction is simpler, cheaper, and more reliable than the previously used methods. It is not adversely affected by salt water, air, moisture or pressure differentials in the water. By connecting several thermocouple junctions in series to form a thermopile, an extremely sensitive apparatus results.

SUMMARY OF THE INVENTION

It has been discovered that a test thermocouple junction which is trailed below the surface of the water will indicate the presence of a wake long after the passage of a vessel, such as a submarine. The invention includes, in a preferred embodiment, a paravane, a pair of thermocouple leads, such as copper and constantan, which are joined at one end to provide a working, test, thermocouple junction and a reference thermocouple junction at the other end. The working thermocouple junction is mounted on the paravance, and the reference junction may be mounted on a vehicle, such as a surface ship which tows the paravane. Means are connected to the reference junction for establishing a reference voltage. A self-compensating recorder progressively returns the recorder indicator to zero as long as a static signal is received thereby. The reference junction is connected to the recorder. A cable connects the paravance to the ship for towing the paravane through the water in a submerged condition.

STATEMENT OF THE OBJECTS OF THE INVENTION

One object of the invention is to provide an apparatus for the detection of a wake which does not require complex electronic circuitry to implement.

Another object of the invention is to provide an extremely sensitive apparatus for the detection of the wake of a vessel.

Still another object of the invention is to provide an apparatus which may detect the wake of either a surface vessel or an underwater vessel.

Other objects, advantages, and novel features of the invention will become apparent from the following detailed description of the invention, when considered in conjunction with the accompanying drawings, wherein:

BRIEF DESCRIPTION OF THE DRAWINGS

FIG. 3 is a diagrammatic view of a wake-detecting apparatus, including a servo-controlled pen recorder.

FIG. 4 is a diagrammatic view of a still more sophisticated version of the wake detecting apparatus, including a resistive network for automatically adjusting the zero reference level of the pen chart recorder, and including an electronic equivalent of a heat sink.

DESCRIPTION OF THE PREFERRED EMBODIMENTS

Figure 1:
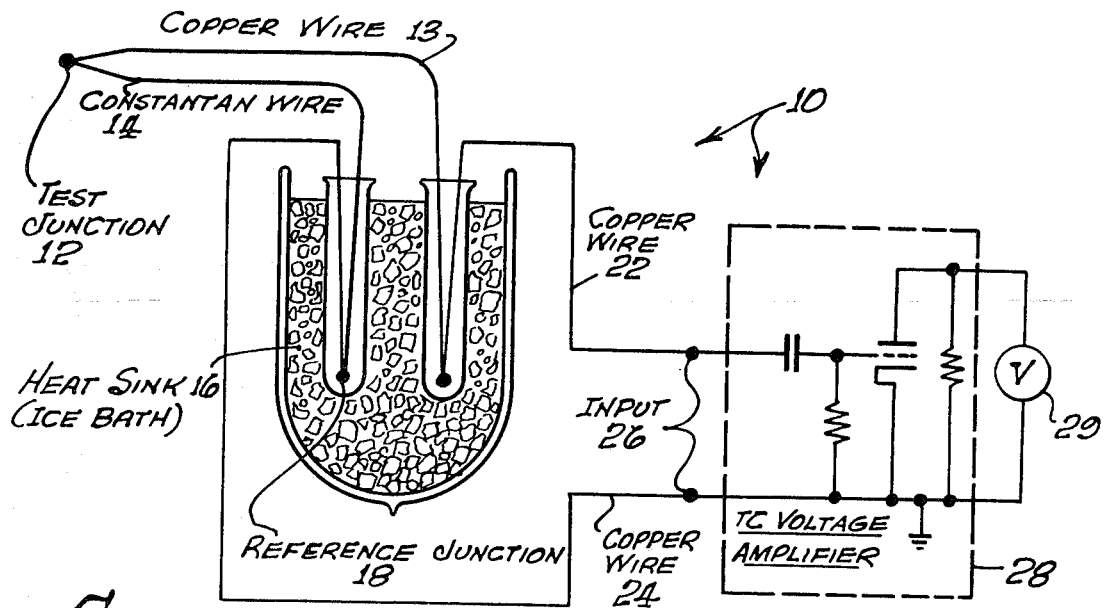
FIG. 1 is a partly diagrammatic and partly schematic view of basic thermocouple circuitry.

FIG. 1 shows the basic elements prior art circuitry associated with a thermocouple, The embodiment 10 shows a test thermocouple (TC) junction 12, to which are connected a copper wire conductor 13 and a conductor of some other metal, for example, constantan 14. The two free ends of the conductors, 13 and 14, are put into a heat sink means 16, such as an ice bath, or some other means of refrigeration at approximately 30°F, where they form a reference junction 18. Two copper wires, 22 and 24, exit the ice bath 16 and are connected to the input 26 of a TC voltage amplifier 28. A voltmeter 29 may be used to read the amplified TC voltage.

Figure 2:
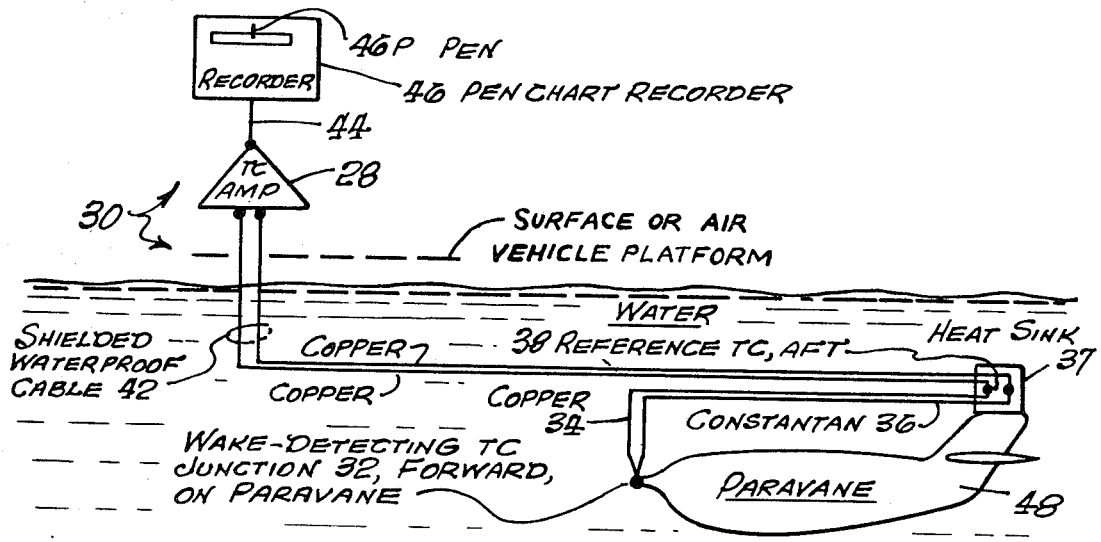
FIG. 2 is a diagrammatic view of the basic apparatus for determining the presence of the wake of a vessel.

In FIG. 2 is shown basic apparatus 30 for determining the presence of a vessel, such as a submarine in the ocean, by detecting its wake, which includes a test thermocouple (TC) junction 32, connected to a length of two TC conductors, one of copper 34 and one of constantan 36. A heat sink 37, into which the free ends of the conductors 34 and 36 are immersed, forms a reference thermocouple junction 38.

Two shielded copper wire conductors 42 come out of the reference junction 38, and are connected to a high-gain, low-frequency amplifier 28, which amplifies the voltage signal generated at the test TC junction 32. The amplifier 28 may produce either a linear or logarithmic output 44, and would generally be an integrating amplifier, so as to average out random fluctuations in the voltage output of the test TC junction 32, as well as to average out any high-frequency signal variations. The output frequency response of the amplifier 28 may be in the range of direct current to 10 cycles per second.

An electrical instrument, such as a pen chart recorder 46 is connected to the output 44 of the amplifier 28, the instrument being adapted for setting to a reference level, generally zero, when the voltage input to it is constant, indicating that the test TC junction 32 is in an environment where the temperature of the water is static.

The output of the amplifier 28 must be of sufficient magnitude to drive the indicator, or pen 46P, of the pen chart recorder 46, which may have either manual or automatic gain control. A pen recorder 46 is used rather than some other type of electrical instrument, such as the voltmeter 29 shown in FIG. 1, because it permits analyzing the recorded data at a later period of time, if necessary.

The test and reference TC junctions, 32 and 38, in a very simple embodiment, may be suspended from a pole on a surface vessel, not shown, but are generally mounted on a vehicle, such as a paravane 48, capable of being towed below the surface of the ocean. When the paravane 48 moves, the TC test junction 32 trails through the water, and thus monitors the temperature of the water, a marked deviation in the temperature of the water from its static value, which indicates the presence of the wake of a vessel, being detectable on the scale of the pen chart recorder 46 by a corresponding deviation in the reading of the recorder from the reference level.

Referring now to FIG. 3, the major improvement in the embodiment 50 shown herein resides in the fact that the pen chart recorder 52 has associated with it feedback circuitry which includes a reference amplifier 54, and a servo motor 56 which controls a drive motor 58 for driving the pen 52P of the recorder. The feedback arrangement provides for more stable operation, and results in the pen 52P remaining in the middle of the range scale until a wake signal actuates the system 50.

FIG. 4 shows an embodiment 60 wherein the heat sink means comprises electronic circuitry, not requiring the conventional refrigerated bath. Effectively, an electronic heat sink is used, with feedback leads 62 connected from the output leads 44 of the TC amplifier 28 to a recorder reference level feedback circuit 64.

The electronic circuitry comprising the recorder reference level feedback circuit 64 includes a d-c power supply 66, for example a battery power supply, and a potentiometer 72, connected in series by one end, a first end, with one of the conductors 42 which is connected to the test TC junction 32 and by the other end to one of the input leads 74L to the TC amplifier 28, the first end also being connected to one of the terminals, the lower one, 66L, of the power supply. A voltage-dropping resistor 68 has one of its ends connected to the other, upper, terminal 66U of the power supply 66, and the other end connected to the junction of the potentiometer 72 and the input lead 74L to the TC amplifier 28, the output voltage of the TC amplifier also being developed across the resistor 68.

The polarity of the d-c power supply 66 and the connection of the potentiometer 72 to one of the test TC conductors 42 is such that the voltage developed across the potentiometer by the test TC junction 32 in an environment where no wake is present is exactly neutralized, in magnitude and polarity, by the voltage developed by the d-c power supply 66 across the potentiometer.

Thereafter, the feedback circuit 64 is fed back a voltage from the output of the TC amplifier 28, by means of leads 62, which maintains the pen 46P at the zero reference level until the test TC junction 32 intercepts a wake, even if the static temperature undergoes a slow variation not due to the presence of a wake.

A pressure transducer 76, with connections to a surface vessel, not shown, would be used if it be desired to know the depth below the surface of the water at which the test TC junction 32 is located.

Also not shown is the cable which tows the paravane 48.

The wake of a submarine going 10 knots has been detected at sea off the coast of California 45 minutes after the submarine had passed. By that time, the sub was over 7 miles away from the towing vessel. The depth of search was 300 ft, where the water temperature was 34°F and a differential temperature of 1/400°F was discernible. It would be possible to plot a pattern of the wake and use the trolling vessel to trace or extrapolate the wake to its source. Also, instead of a trolling vessel a helicopter could carry the small amount of equipment needed to record the trend of the wake. A submarine may also serve.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the presence of a vessel, such as a submarine in the ocean, by detecting its wake, comprising:
    a test thermocouple (TC) junction connected to a length of two thermocouple conductors;
    heat sink means, into which the free ends of the conductors are immersed, to form a reference thermocouple junction;
    an electrical indicating instrument, connected to the free ends of the two conductors, the indicator of the instrument being adapted for setting to a reference level, generally zero, when the voltage across the two conductors is constant, indicating that the test thermocouple junction is in an environment where the temperature of the water is static;
    a submersible tow capable of being towed by a vehicle;
    the test TC junction being mounted on the submersible tow, and thus monitors the temperature of the water;
    whereby a marked deviation in the temperature of the water from its static value, which indicates the presence of the wake of a vessel, is detectable on the scale of the electrical instrument by a corresponding deviation in the reading of the instrument from the reference level reading.

2. Apparatus according to claim 1, further comprising:
    a plurality of test thermocouple junctions connected in series with the first-named test TC junction, to form a thermopile, thereby making a more sensitive apparatus.

3. Apparatus according to claim 1, wherein the electrical instrument is a pen chart recorder.

4. Apparatus according to claim 3, further comprising:
a voltage amplifier connected between the two conductors at the reference TC junction and the pen chart recorder, for amplifying the voltage generated by the test TC junction.

5. The apparatus according to claim 4, wherein the submersible tow is a paravane which is towed by a moving vehicle.

6. The apparatus according to claim 4, further comprising:
a self-compensating circuit, connected between the voltage amplifier and the electrical instrument, which maintains the reading of the instrument at the reference level in spite of random fluctuations in the temperature of the water, until a significant temperature change is encountered.

7. The apparatus according to claim 6, wherein the self-compensating circuit comprises an integrating circuit.

8. The apparatus according to claim 7, wherein the heat sink means comprises electronic circuitry, not requiring any refrigerated bath.

9. The apparatus according to claim 8, wherein the electronic circuitry comprises:
a d-c power supply;
a potentiometer, connected in series by one end, a first end, with one of the conductors which is connected to the test TC junction, and by the other end to one of the input leads to the TC amplifier, the first end also being connected to one of the terminals of the power supply;
a voltage-dropping resistor, one end of which is connected to the other terminal of the power supply, and the other end of which is connected to the junction of the potentiometer and the input lead to the TC amplifier, the output voltage of the TC amplifier also being developed across the resistor;
the polarity of the d-c power supply and the connection of the potentiometer to one of the test TC conductors being such that the voltage developed across the potentiometer by the test TC junction in an environment where no wake is present is exactly neutralized by the voltage developed by the d-c power supply across the potentiometer.

10. A method for determining the presence of a vessel, such as a submarine in the ocean, by detecting its wake, comprising the steps of:
trolling a test thermocouple junction connected to two thermocouple conductors beneath the surface of the ocean;
immersing the two thermocouple conductors in a heat sink means, thereby providing a reference thermocouple junction; and
connecting the two leads from the reference junction to an electrical instrument, such as a pen chart recorder, and setting the steady-state voltage to a reference level, generally zero;
whereby a substantial deviation from the reference level on the chart recorder paper indicates the presence of the wake of a vessel.

* * * * *